(12) United States Patent
Baranowski et al.

(10) Patent No.: US 10,576,898 B2
(45) Date of Patent: Mar. 3, 2020

(54) PORTABLE TRANSPORT CONTAINER AND TRANSPORT CONTAINER HOLDER SYSTEM OF A VEHICLE

(71) Applicant: FORD GLOBAL TECHNOLOGIES, LLC, Dearborn, MI (US)

(72) Inventors: Thomas Baranowski, Würselen (DE); Maik Broda, Würselen (DE); Julius Maximilian Engelke, Aachen (DE); Marcel Mathissen, Würselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/124,420

(22) Filed: Sep. 7, 2018

(65) Prior Publication Data

US 2019/0077321 A1 Mar. 14, 2019

(30) Foreign Application Priority Data

Sep. 12, 2017 (DE) .................. 10 2017 216 062

(51) Int. Cl.
*B60R 7/02* (2006.01)
*B65D 6/18* (2006.01)
(Continued)

(52) U.S. Cl.
CPC .................. *B60R 7/02* (2013.01); *B60R 5/04* (2013.01); *B60R 11/00* (2013.01);
(Continued)

(58) Field of Classification Search
CPC ..... B60R 2011/0036; B60R 7/02; B60R 5/04; B65D 11/1826; B65D 11/18;
(Continued)

(56) References Cited

U.S. PATENT DOCUMENTS 4,567,070 A * 1/1986 Karass ................... B65D 5/445
206/813
4,718,597 A * 1/1988 Bishop ................. B65D 5/4608
229/117.16

(Continued)

FOREIGN PATENT DOCUMENTS

DE 102006049199 A1 4/2008
EP 0623500 A1 * 11/1994 ........... B62B 3/1464
(Continued)

OTHER PUBLICATIONS

English Machine Translation of DE102006049199A1.
English Machine Translation of FR20343556A6.

*Primary Examiner* — Justin M Larson
(74) *Attorney, Agent, or Firm* — David Coppiellie; King & Schickli, PLLC

(57) ABSTRACT

A portable transport container includes at least one base panel and at least four side panels which are connected to one another with pivotable connections in order to enable a movement of the transport container at least between an open use position and a closed storage position. The at least one base panel and the four side panels are composed primarily of plastic. A plurality of reinforcing elements comprising plastic film are provided which are connected in a firmly bonded manner at least in sections contiguously near to the surface either to the base panel or to one of the four side panels. A transport container holder system of a vehicle includes at least one such portable transport container and a trunk floor and/or a backseat bench of the vehicle, in which at least one open cavity for accommodating one of the portable transport containers is provided for each of the portable transport containers.

10 Claims, 6 Drawing Sheets

Figure 1:
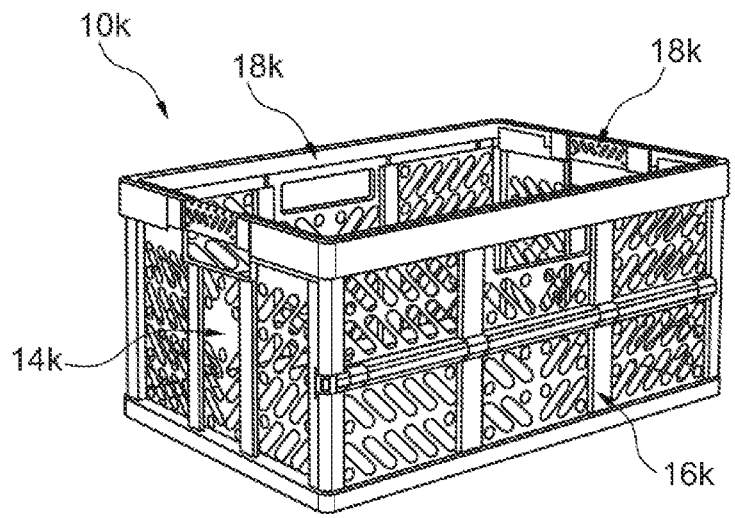
Figure 1:
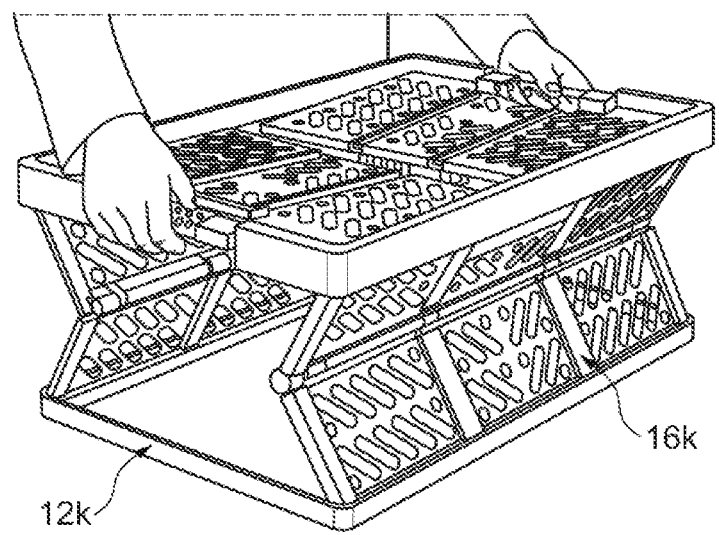

(51) Int. Cl.
*B60R 5/04* (2006.01)
*B60R 11/00* (2006.01)
*B65D 5/44* (2006.01)

(52) U.S. Cl.
CPC ... B65D 11/1826 (2013.01); *B60R 2011/0036* (2013.01); *B65D 5/445* (2013.01)

(58) Field of Classification Search
CPC .... B65D 11/1833; B65D 5/441; B65D 5/445; B65D 5/448; B65D 5/3635; B65D 5/20
See application file for complete search history.

(56) References Cited

U.S. PATENT DOCUMENTS

| | | | | |
|---|---|---|---|---|
| 5,076,457 | A * | 12/1991 | Marovskis | B65D 11/1833 220/1.5 |
| 5,772,108 | A * | 6/1998 | Ruggiere, Sr. | B65D 5/36 229/109 |
| 7,466,233 | B2 * | 12/2008 | Drapala | G06K 19/07718 340/572.1 |
| 7,477,150 | B2 * | 1/2009 | Renzetti | B65D 5/00 340/572.1 |
| 7,731,082 | B2 * | 6/2010 | Jackson | B65B 13/02 206/497 |
| 8,991,684 | B2 * | 3/2015 | Mengistu | B65D 5/326 229/110 |
| 9,469,432 | B2 * | 10/2016 | Aguirre | B65D 5/443 |
| 9,932,143 | B2 * | 4/2018 | Henderson | B65D 11/1833 |
| 2002/0145022 | A1 | 10/2002 | Nguyen et al. | |
| 2012/0273561 | A1 | 11/2012 | Irvin et al. | |
| 2019/0077321 | A1 * | 3/2019 | Baranowski | B60R 5/04 |

FOREIGN PATENT DOCUMENTS

| | | | | | |
|---|---|---|---|---|---|
| EP | 1205355 | A2 * | 5/2002 | | B61D 37/00 |
| FR | 2034356 | A6 | 12/1970 | | |
| GB | 2108084 | A * | 5/1983 | | B65D 5/3642 |
| GB | 2393951 | A * | 4/2004 | | B65D 5/2047 |
| GB | 2393951 | A | 4/2004 | | |

* cited by examiner

PORTABLE TRANSPORT CONTAINER AND TRANSPORT CONTAINER HOLDER SYSTEM OF A VEHICLE

TECHNICAL FIELD

This document relates to a portable transport container, in particular for a vehicle, and to a transport container holder system of a vehicle, as well as to a method for the production of such a portable transport container.

BACKGROUND

Portable containers for the transport of a load, which can be composed, for example, of purchased goods, should have as low as possible a tare weight in relation to the load. This requirement is inconsistent with demands in terms of a mechanical strength of the container which is required for safe transport of the load.

In order to satisfy this demand, proposals to improve the mechanical strength of portable containers are known from the prior art.

For example, US 2012/0273561 A1 describes a container which comprises at least one panel or flap which is provided to; form at least a part of a base or at least a wall of the container. The panel or flap comprises a corrugated board and has an inner surface and an outer surface. The container has at least one reinforcing band or a reinforcing strand which is fastened to at least one panel or flap of the container by adhesive connection, wherein the reinforcing band or the reinforcing strand comprises an adhesive which is arranged on a substrate. The substrate can be a fibrous material or a non-fibrous material such as a polymer film. The fiber material can be present in the form of a woven or non-woven strip, a fiber-reinforced film, a fiber bundle, a monofilament or any desired combination thereof. Examples of fiber bundles comprise multifilament threads which can be oriented unidirectionally.

The reinforcing band or the reinforcing strand has a secant modulus in the case of an expansion between 0% and 4% of at least 100 g/den (1 den=1 g/9000 m). The reinforcing band or the reinforcing strand has a width which is smaller than or equal to 10 mm. The reinforcing band or the reinforcing strand can be applied on a substrate of the container during production of the substrate. Alternatively, the reinforcing band or the reinforcing strand can be applied on a container once the container has been shaped or folded or glued to form a finished container.

GB 2 393 951 A also discloses a single-use crate insert which comprises a front wall, an end wall and two side walls which are assembled using connecting flaps in order to form a container which fits into a plastic storage crate. Packed in a plastic storage crate, the single-use crate insert can be transported in stacks and removed at its destination so that the plastic storage crate can be returned. Folds make it possible that the single-use crate insert can be folded together and stored for collection in a nested stack of plastic storage crates. Openings reinforced by adhesive band or molded parts in the front and end wall and connecting flaps are oriented in relation to one another in order to form grips.

FR 2 034 356 A2 further proposes packing crates which comprise shaped panels composed of expanded polystyrene with chamfered ends and wedge grooves, which are spaced apart in intervals, in the panels in order to make it possible for the panels to be folded into a crate form, the fold lines being reinforced by an integrated band of flexible material, preferably of polypropylene. The band is preferably perforated or has projections in order to improve its anchoring in the panels. In particular, the packaging crates are useful for the production of fruit crates which can be folded flat for storage or for return for reuse. The construction can comprise base panels which are locked on rails which are attached to the side walls and can have partition grids. The proposed reinforcing bands have a pair of wedge-shaped ribs which contribute to aligning the band in the mold with the panel hinge axes.

Portable containers for use in a vehicle and in particular with means for fastening on a loading surface of the vehicle are furthermore known in the prior art in order to prevent the portable container from slipping during travel.

For example, US 2002/0145022 A1 thus describes a use container/carrier which can be folded together and which is mounted fully in a folded state and is ready for use in Sports Utility Vehicles (SUVs), vans or commercial vehicles with an open loading area (flatbed trucks) for the transport of sacks of foodstuffs and the like without tipping over or sliding when the vehicle is moving. Fitted with Velcro and magnets on the outer panels, the use container/carrier can be stored or used in the cargo compartment of a vehicle where materials such as fabric, floor mats, carpets or bare metal are present. The use container/carrier can also be secured with elastic bands at fastening points of an open loading area. In a folded-together state, the use container/carrier can be stored behind a backseat, a backseat bench or within the luggage compartment of the vehicle. The use container/carrier is composed of polypropylene and comprises six premounted foldable panels, namely four vertical panels and two floor panels with separating walls. Pins are permanently fitted as hinges to the panels and separating walls to be used as a complete unit. Within seconds, the use container/carrier can be folded up for storage or unfolded for use.

DE 10 2006 049 199 A1 further proposes a storage arrangement with at least one container for accommodating articles in a vehicle. The container can be fastened in a vehicle-side recess and is at least adjustable from a use position into a non-use position.

Each container of the storage arrangement has an approximately rectangular base and in each case two shorter walls and two longer walls. In each case a handle for handling the respective container is attached to the shorter walls. At least the walls of the container are formed from a flexible material with several portions which can be made stiffer.

These portions which can be made stiffer make it possible to fix specific geometrical forms in the position of use of the container in order to ensure sufficient stability for accommodating articles. The portions which can be made stiffer can be fixed in a specific position by application of external forces in order then to be adjusted where necessary by corresponding counterforces from this stable position for transfer into a non-use position of the container. Specific plastics which have the properties described above can preferably be used as a flexible material for the walls of the container.

In view of the highlighted prior art, there is still room for improvement in the field of portable transport containers for use in combination with a vehicle.

SUMMARY

One object is to provide a portable transport container with a low tare weight in the case of a high bearing capacity which can be transported safely and without displacements during travel in a trunk of a vehicle.

It is another object to provide a portable transport container and a transport container holder system of a vehicle. This object is further achieved by a method for the production of such a portable transport container.

It should be pointed out that the features and measures listed individually in the following description can be combined with one another in any desired technically expedient manner and highlight further configurations of the portable transport container and portable transport container holder system. The description characterizes and additionally specifies the portable transport container and portable transport container holder system in particular in conjunction with the figures.

The portable transport container has at least one base panel and at least four side panels which are connected to one another with pivotable connections in order to enable a movement of the transport container at least between an open use position and a closed storage position. The at least one base panel and the four side panels are primarily composed of plastic.

The term "portable" should be understood for purposes of this document to be in particular a transport container, the maximum total weight of which, including articles or goods contained therein, is between 15 and 50 kg so that it can be carried by one normal person or jointly by two normal persons.

The term "primarily" should be understood for purposes of this document to be in particular a ratio of more than 50 vol. %, preferably more than 70 vol. % and, particularly preferably, more than 90 vol. %. The term should in particular include the possibility that the portable transport container is composed entirely, i.e. 100%, of plastic.

It is proposed that a plurality of reinforcing elements comprising plastic film are provided which are connected in a firmly bonded manner at least in sections contiguously near to the surface either to the base panel or to one of the four side panels.

The term "plurality" should be understood within the meaning of the invention in particular to be a number of at least two. The term "provided for" should be understood within the meaning of the invention to be specially configured or arranged for.

In this manner, a portable transport container with significantly reduced wall thickness of the base panel and the side panels and a resultant lower tare weight can be provided which is particularly suitable in particular for use in combination with a vehicle since fuel can then also be saved if the portable transport container is stored in the vehicle, but is not in use.

The term "vehicle" should be understood for purposes of this document to be a car, a heavy goods vehicle or a bus.

The reinforcing elements of the plurality of reinforcing elements are preferably arranged along virtual lines which correspond to force-introduction lines of a transport container with an identical form without the plurality of reinforcing elements. In this manner, a particularly effective reinforcement of the strength of the portable transport container can be achieved with little material outlay.

The plastic film of the plurality of reinforcing elements is primarily composed of the same plastic material as the base panel and the four side panels. As a result, a particularly long-lasting and load-bearing firmly bonded connection between the reinforcing elements and the base panel or one of the side panels can be achieved in a simple manner.

The plastic film of the plurality of reinforcing elements particularly advantageously contains at least one thermoplastic plastic material. The thermoplastic plastic materials can preferably be selected from a group consisting of polypropylene (PP), the polyamide (PA) group, polycarbonate (PC), polyetherimide (PEI), polyoxymethylene (POM), acrylonitrile-butadiene-styrene copolymer (ABS), polyester (PE) including polyethylene terephthalate (PET), possible foamed forms of these plastic materials and a possible mixture of at least two of these materials. The stated materials are lightweight, have sufficiently high strength and allow the use of mass production methods such as, for example, injection molding, as a result of which even complex structures of the base panel or one of the side panels can be produced in a simple manner.

If the reinforcing elements have fibers which are connected in a firmly bonded manner to the plastic film, a portable transport container can be provided in the case of which the wall thickness of the base panel and the side panels can be further reduced, from which a further reduced tare weight of the transport container results. As a result, the portable transport container is very particularly suitable for use in combination with a vehicle.

The fibers which are connected to the plastic film in a firmly bonded manner can be oriented in a single direction, for example, in the direction of extent of the plastic film. A significant increase in strength in comparison to a force acting in the direction of the fibers can already be achieved as a result of this. The fibers can alternatively also be oriented in two directions which form an angle which is different from zero, wherein the smaller angle formed by the two intersecting directions is in a range between 20° and 90°. As a result, an increase in strength can also be achieved in comparison to a force acting perpendicular to one of the intersecting directions. In order to increase strength, the fibers can furthermore also be oriented in more than two different directions, as a result of which an approximately isotropic strength distribution can be achieved.

The fibers are preferably formed by glass fibers, carbon fibers or aramid fibers or a mixture of at least two of these fibers. These types of fibers are commercially available so that reinforcing elements can be provided in a simple manner with fibers which are connected in a firmly bonded manner to the plastic film.

A particularly good increase in the mechanical strength values of the base panel and one of the side panels can be achieved if reinforcing elements from the plurality of reinforcing elements connect diagonally opposite corners at least of the base panel or one of the four side panels to one another.

In the preferred embodiments of the portable transport container, the at least one base panel is equipped on its under side with at least one grip element. In this manner, handling of the portable transport container can be improved in particular from the closed storage position.

The at least one grip element is particularly advantageously formed as a piece of an elastic band which is fastened at its two ends to the base panel since the at least one grip element can bear flat against the base panel in a space-saving manner in this case in the case of non-use.

In a further aspect, a transport container holder system of a vehicle is proposed. The transport container holder system comprises at least one portable transport container and a trunk floor and/or backseat bench of a vehicle.

At least one open cavity for accommodating one of the portable transport containers is provided in the trunk floor and/or backseat bench for each of the portable transport containers. Here, the portable transport container can be held both in the open use position and in the closed storage position in a positive-locking manner in the open cavity.

Moreover, a depth of the open cavity is adapted to a height of the portable transport container in the closed storage position in such a manner that an under side of the base panel is flush with the trunk floor or with the backseat bench in the case of a base panel which faces upwards.

As a result of the positive-locking holding of the portable transport containers in the respective open cavity, a slipping of the transport container during travel can be effectively prevented. As a result of the adjustment of the depth of the cavities to the heights of the respective transport containers, the trunk base forms with the under sides of the base panels of the transport containers a flat surface which can be advantageously loaded.

In the advantageous embodiments of the transport container holder system which comprise a trunk floor, a plurality of fixedly attached slide rails are provided on the trunk floor for each of the portable transport containers between the respectively open cavity and a rear end of the trunk floor.

As a result of the fixedly attached slide rails, a filled portable transport container can, for example, be pushed during loading into the trunk on the slide rails up to an associated open cavity, as a result of which the loading of the transport containers can be significantly facilitated.

The slide rails are preferably produced from a smooth plastic material, for example, from polytetrafluoroethylene (PTFE).

In another aspect, a method for producing the disclosed portable transport container is proposed.

The method is characterized by at least the following steps: providing an injection molding device including an injection mold, arranging reinforcing elements comprising plastic films in the injection mold, closing the injection mold, overspraying the reinforcing elements by means of the injection molding device with a plastic melt for formation of either the base panel or one of the side panels, cooling and opening the injection mold, and removing the produced base panel or side panel.

By using this method, the base panel and the side panels of the disclosed portable transport container can be produced with a high degree of accuracy to size and short production times in a low-cost manner. As a result the high degree of accuracy to size, final assembly of the portable transport container from the produced base and side panels can be performed in a simplified manner.

The step of arranging the reinforcing elements comprising plastic films in the injection mold particularly preferably includes the reinforcing elements being attached on a piece of carpeted floor which is adapted to a surface of the base panel, and the piece of carpeted floor being arranged with the attached reinforcing elements in the injection mold.

In this manner, the under side of the base panel can be equipped directly during its production with carpeted floor which is formed preferably identically to a carpeted floor provided as the surface of the trunk floor. If the portable transport container is located in the closed storage position in the associated open cavity, as a result of this, a uniform surface of the trunk floor and a seamless integration of the portable transport container in the trunk of the vehicle can be achieved.

BRIEF DESCRIPTION OF THE DRAWING FIGURES

FIG. 1 shows a portable transport container according to the prior art in a perspective view.

Advantageous new configurations of the portable transport container and portable transport container holder system are disclosed in the following claims and the following description of the figures.

Figure 2:
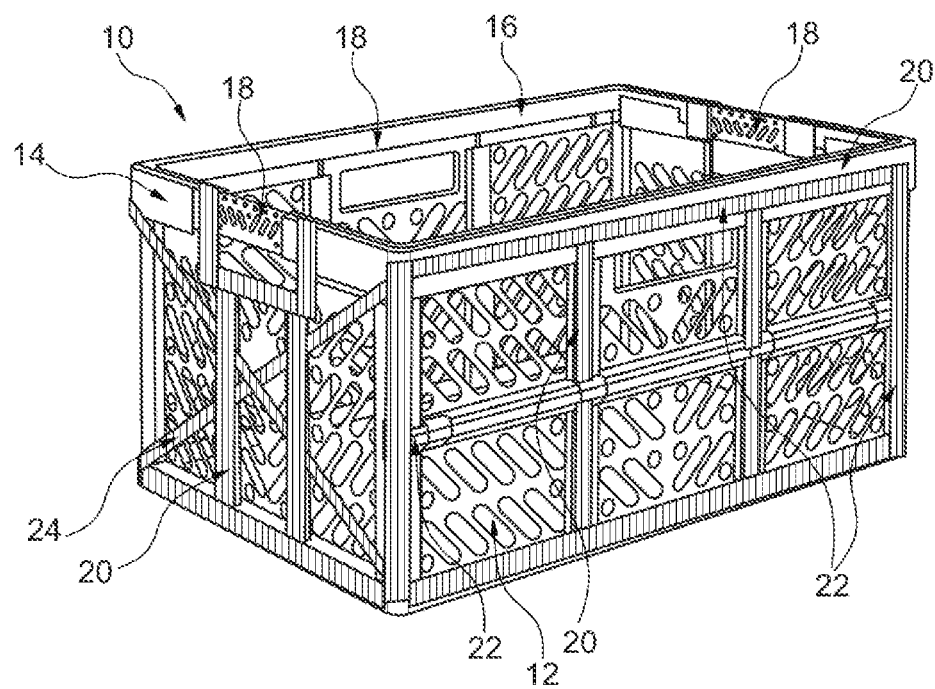
Figure 3:
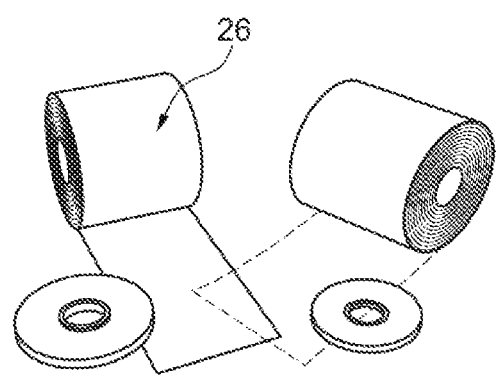
Figure 4:
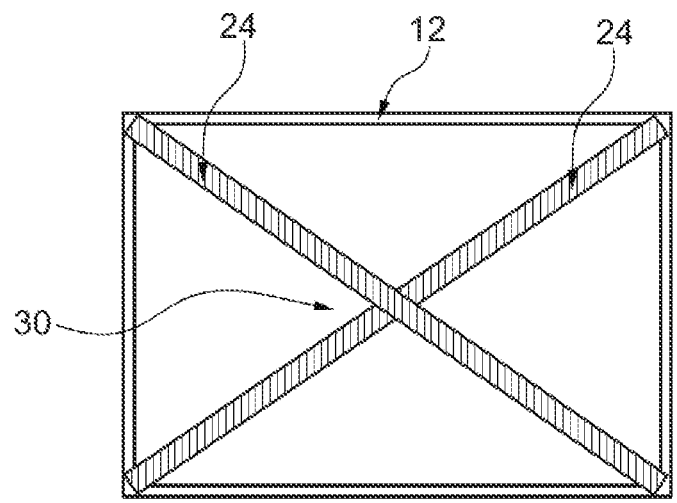
Figure 5:
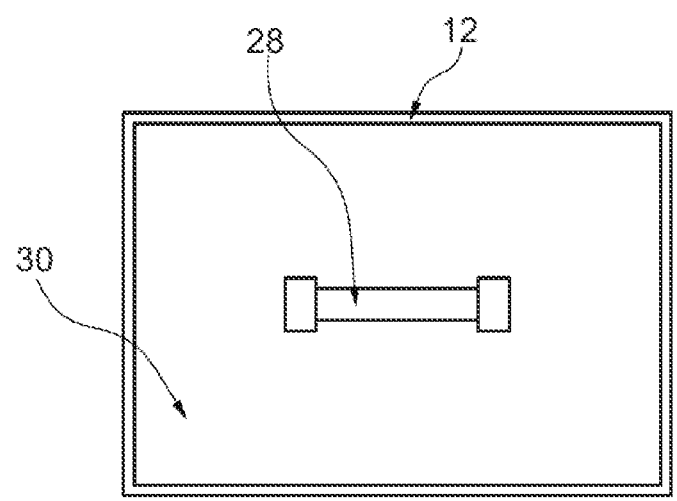
Figure 6:
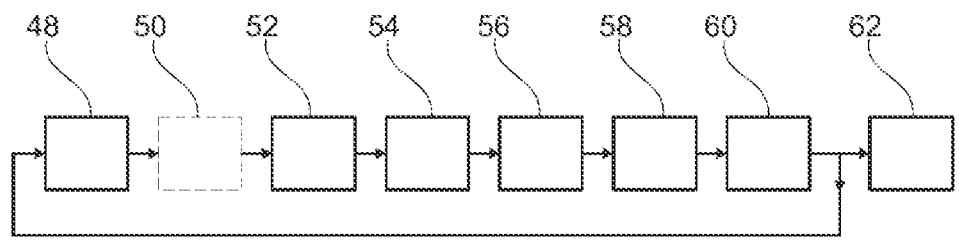
Figure 10:
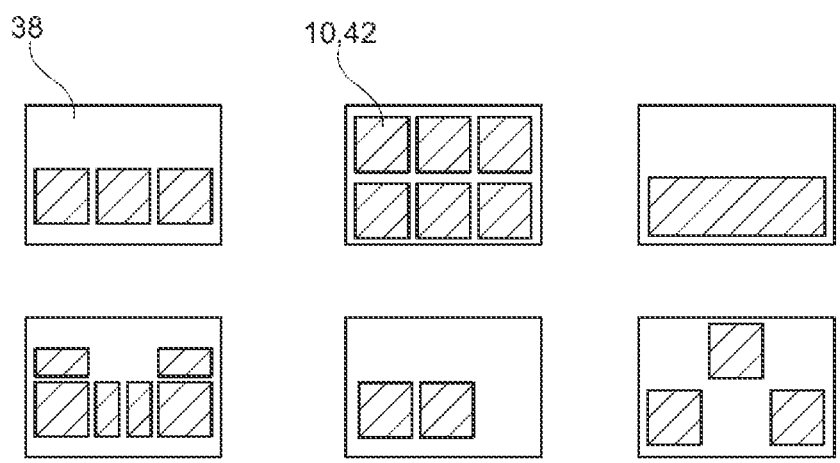
Figure 7:
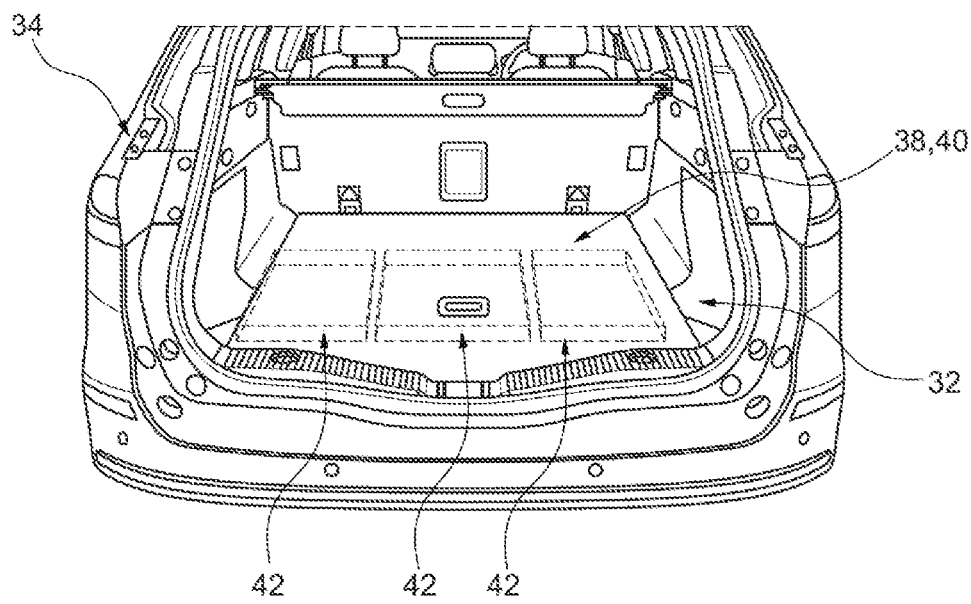
Figure 8:
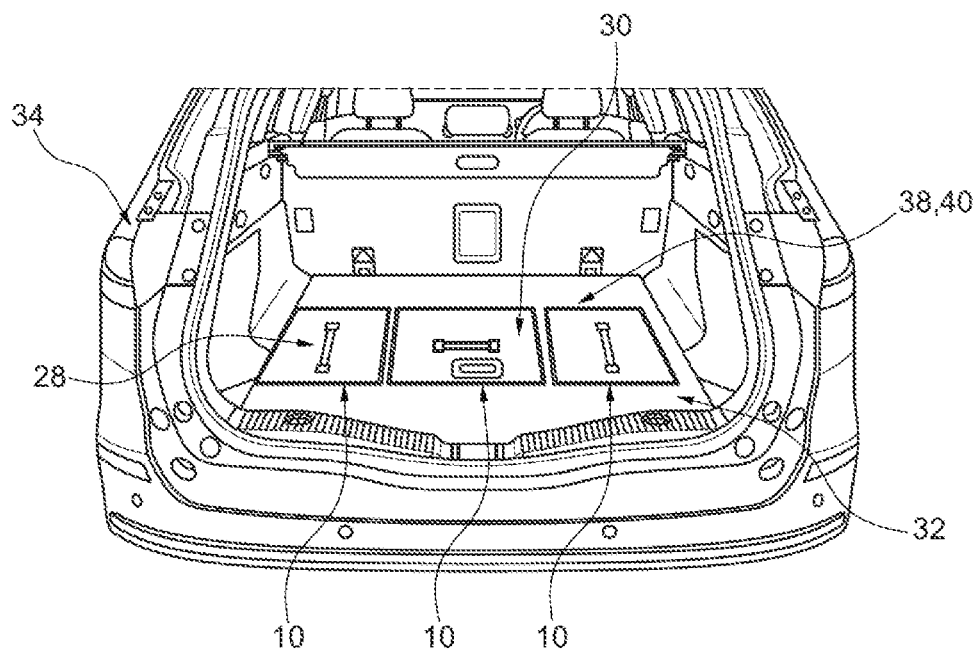
Figure 9:
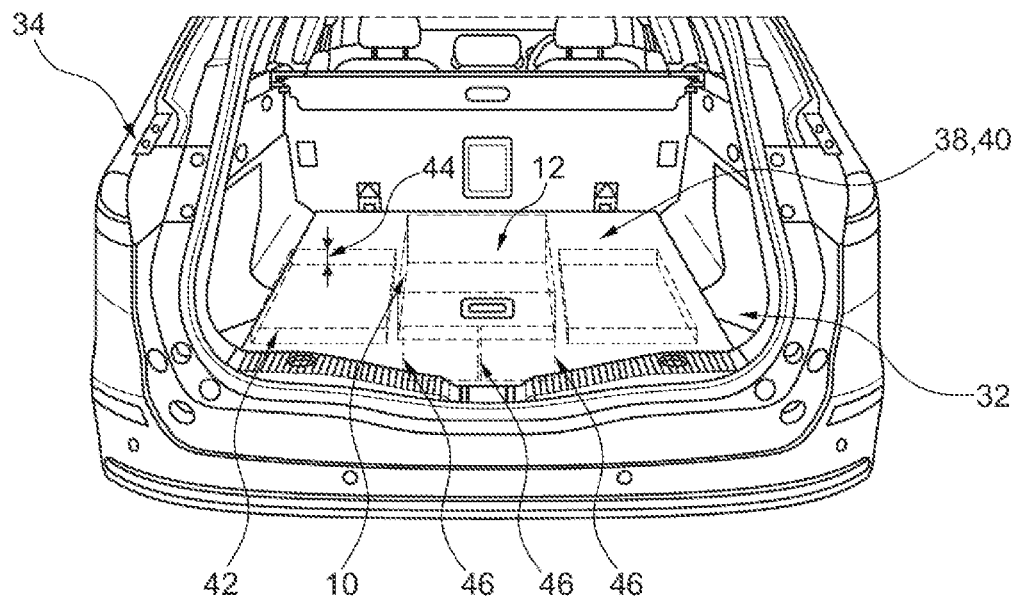
Figure 11:
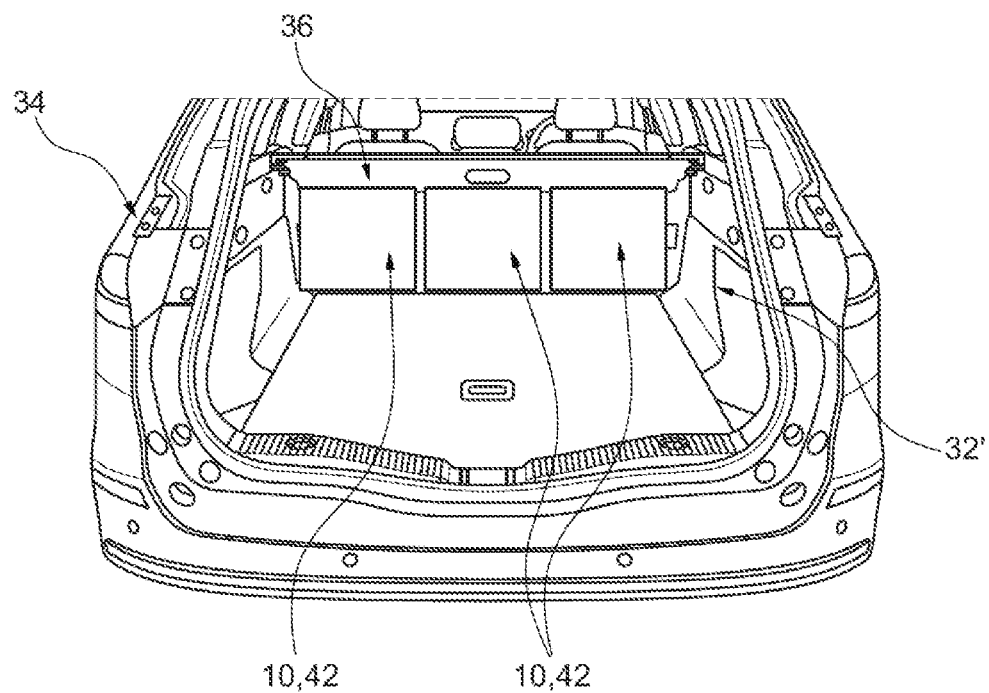

FIG. 2 shows the new and improved portable transport container in a perspective view, FIG. 3 shows reinforcing elements comprising glass fiber-reinforced plastic film for a portable transport container according to FIG. 2, FIG. 4 shows a view of the under side of the base panel of the portable transport container according to FIG. 2, FIG. 5 shows a further view of the under side of the base panel of the portable transport container according to FIG. 2, FIG. 6 shows a flow chart of the method for the production of the portable transport container according to FIG. 2, FIG. 7 shows a schematic representation of parts of a transport container holder system, FIG. 8 shows a schematic representation of the transport container holder system according to FIG. 7 with portable transport containers in the closed storage position, FIG. 9 shows a schematic representation of the transport container holder system according to FIG. 7 with one of the portable transport containers in the open use position, FIG. 10 shows alternative arrangements of portable transport containers in associated open cavities of the trunk floor of the vehicle according to FIG. 7 in a schematic representation, and FIG. 11 shows a schematic representation of an alternative transport container holder system with portable transport containers in the closed storage position.

DETAILED DESCRIPTION

Identical parts are always provided with the same reference numbers in the various figures, which is why these are also generally only described once.

FIG. 1 shows, by way of example, a portable transport container 10$k$ (OKT Profi Klapp-Box 45 l from Keeeper, formerly OKT, Stemwede) according to the prior art. Portable transport container 10$k$ has a rectangular base panel 12$k$, two oppositely arranged one-piece side panels 14$k$ and two oppositely arranged two-piece side panels 16$k$ which are embodied to be foldable by in each case one hinge arranged in the longitudinal direction. An annular grip element 18$k$ is arranged on an upper side of each side panel 14$k$, 16$k$. Base panel 12$k$ and side panels 14$k$, 16$k$ are connected to one another by pivotable connections, namely by hinges with steel pins, in order to enable a movement of portable transport container 10$k$ between an open use position (FIG. 1 top) and a closed storage position (transition position in FIG. 1 bottom). Conventional portable transport container 10$k$ is composed primarily of plastic, namely of polypropylene, and has a capacity of 45 l and a load-bearing capacity of 50 kg (dimensions 54×37×28 cm (W×D×H)).

FIG. 2 shows one possible embodiment of a new and improved portable transport container 10 in a perspective view. Portable transport container 10 corresponds in its construction to conventional portable transport container 10$k$ represented in FIG. 1, but suffices with a wall thickness which is smaller by 20% to 40% and has a corresponding reduced tare weight. Portable transport container 10 has a plurality of reinforcing elements 22. Reinforcing elements 22 comprise a strip-shaped plastic film 26 which is formed with a constant width (FIG. 3), which contains a mixture of thermoplastic plastic materials, namely polyamide and polyester. Plastic film 26 forms a matrix for aramid fibers which are connected in a firmly bonded manner to plastic film 26 (for example Kevlar®) which are oriented along a longitudinal direction of extent of plastic film 26. Examples of such aramid fiber-reinforced plastic films 26 with various widths are shown in FIG. 3.

In order to achieve a particularly good mechanical connection between reinforcing elements 22 and base panel 12 (FIG. 2) or side panels 14, 16, plastic film 26 of reinforcing elements 22 can alternatively be selected from the same plastic material as base panel 12 or side panels 14, 16.

As is apparent from FIG. 2, the plurality of reinforcing elements 22 are arranged along virtual lines which correspond to force-introduction lines of a portable transport container 10k with an identical form without the plurality of reinforcing elements 22. For example, some of the virtual lines correspond to vertically or horizontally arranged webs 20 of side panels 14, 16. Other virtual lines are arranged around annular grip elements 18 of portable transport container 10.

Reinforcing elements 22 are embodied as contiguous strips of aramid fiber-reinforced plastic film 26 and are connected in a firmly bonded manner near to the surface either to base panel 12 or to one of side panels 14, 16.

In each case two reinforcing elements 24 of the plurality of reinforcing elements 22 are attached to the two oppositely arranged, short, one-piece side panels 14 (only shown in the case of one side panel 14) of portable transport container 10 in such a manner that they connect diagonally opposite corners to one another.

It is apparent in the view represented in FIG. 4 of the under side of base panel 12 of portable transport container 10 according to FIG. 2 that two reinforcing elements 24 of the plurality of reinforcing elements 22 are attached so that they connect the diagonally opposite corners of base panel 12 to one another. For the purpose of illustration, reinforcing elements 24 are shown open in FIG. 4, despite the fact that they are arranged below a carpeted floor piece 30, which will be discussed in greater detail below.

A further view of the under side of base panel 12 of portable transport container 10 according to FIG. 2 is reproduced in FIG. 5. As is apparent, base panel 12 is equipped on its under side with a loop-shaped grip element 28 which has a piece of a rubber-elastic band. The elastic band is fastened at its two ends with end caps to base panel 12 and bears flat against base panel 12 in a space-saving manner in the case of non-use. As is described in greater detail below, loop-shaped grip element 28 on the under side of base panel 12 improves handling of portable transport container 10.

FIG. 6 shows a flow chart of a possible embodiment of a method for the production of portable transport container 10 according to FIG. 2.

In a first step 48 of the method, an injection molding device including an injection mold and a supply with polypropylene (PP) granulate are provided. In a subsequent step 52, reinforcing elements 22, 24 of the plurality of reinforcing elements 22 are arranged in the injection mold in accordance with the locations provided for one of side panels 14, 16. If the injection mold is a mold for the production of base panel 12, reinforcing elements 22, 24 of the plurality of reinforcing elements 22 are attached to a carpeted floor piece 30 (FIG. 4) in a preparative step 50.

In a next step 54 of the method, the injection mold is closed. If part of the PP granulate is heated to a predetermined temperature, in a further step 56, overspraying of reinforcing elements 22, 24 is performed by means of the injection molding device with the PP melt for formation either of base panel 12 or one of side panels 14, 16.

After cooling to a predetermined cooling temperature, the injection mold is opened in a further step 58, and the molded base panel 12 or molded side panel 14, 16 can be removed from the injection mold or discharged in a familiar manner in a next step 60 of the method.

In a final assembly step 62, produced base panel 12 and four produced side panels 14, 16 are finally assembled to form a portable transport container 10.

FIG. 7 reproduces a schematic representation of parts of a transport container holder system 32 of a vehicle 34 formed by a car. Transport container holder system 32 comprises three of portable transport containers 10 as described above and a trunk floor 38 of vehicle 34.

Trunk floor 38 is equipped on its surface with a carpeted floor covering 40 which is formed to be identical in terms of the material properties to carpeted floor piece 30 attached to the under side of base panel 12 (FIG. 4). An associated open cavity 42 for accommodating portable transport container 10 is provided in trunk floor 38 for each of three portable transport containers 10 (FIG. 7). Carpeted floor covering 40 is recessed at the locations of open cavities 42. In one alternative embodiment, carpeted floor covering 40 can be continued on the side walls of open cavities 42.

Each of three portable transport containers 10 can be held in a positively-locking manner in its open use position in associated open cavity 42, as a result of which it is effectively secured against displacement during travel of vehicle 34. The positive-locking holding is shown for central portable transport container 10 in FIG. 9.

A depth 44 of each of three open cavities 42 is adapted to a height of associated portable transport container 10 in the closed storage position in such a manner that an under side of base panel 12 of respective portable transport container 10 is flush with trunk floor 38 if it is held in a positive-locking manner in associated open cavity 42 when base panel 12 faces upwards, as is represented in FIG. 8.

In this configuration, carpeted floor covering 40 of trunk floor 38 and carpeted floor pieces 30 of portable transport containers 10 form a uniform surface which is only interrupted by loop-shaped grip elements 28 attached to the under sides of base panels 12 so that a seamless integration of three portable transport containers 10 in the trunk of vehicle 34 is achieved.

Portable transport containers 10 can be easily removed from open cavities 42 at their grip elements 28 attached to the under side of base panel 12, as a result of which it is transferred with the same movement from the closed storage position into the open use position.

As shown in FIG. 9, a plurality of fixedly attached slide rails 46 composed of polyamide are provided on trunk floor 38 for each of portable transport containers 10 between respective open cavity 42 and a rear end of trunk floor 38, on which plurality of slide rails a filled portable transport container 10 can be pushed on carpeted floor piece 30 on the under side of base panel 12 during loading into the trunk up to associated open cavity 42, as a result of which loading of portable transport container 10 is significantly facilitated.

Other set-ups are conceivable in addition to the configuration represented in FIGS. 7 to 9 with three open cavities 42 arranged next to one another. A non-restrictive selection of alternative arrangements of portable transport containers 10 in associated open cavities 42 of trunk floor 38 of vehicle 34 according to FIG. 7 is reproduced in a schematic representation in FIG. 10.

A schematic representation of an alternative transport container holder system 32' with portable transport containers 10 in the closed storage position is shown in FIG. 11. Transport container holder system 32' comprises, in addition to the three portable transport containers 10 described above, a backseat bench 36 of vehicle 34. In contrast to the previous exemplary embodiment, three portable transport containers 10 and associated open cavities 42' are arranged in the rear side of backseat bench 36 of vehicle 34. In the closed storage position, portable transport containers 10 can, in addition to the positive-locking connection, be retained with a latching connection within the associated open cavity. Such latching connections are known in the prior art and therefore do not have to be described in greater detail at this point. In the case of tilted back backseat bench 36, portable transport containers 10 can be held in a positive-locking manner in the open use position in the associated open cavity.

What is claimed:

1. A portable transport container comprising at least one base panel and at least four side panels that are connected to one another with pivotable connections in order to enable a movement of the transport container at least between an open use position and a closed storage position, the at least one base panel and the four side panels being composed primarily of plastic, wherein a plurality of reinforcing elements including a plastic film are connected near to a surface either to the base panel or to one of the four side panels; wherein certain reinforcing elements from the plurality of reinforcing elements connect diagonally opposite corners at least of the base panel or one of the four side panels to one another.

2. The portable transport container as claimed in claim 1, wherein the plastic film is composed primarily of the same plastic material as the base panel and the four side panels.

3. The portable transport container as claimed in claim 2, wherein the plastic film contains at least one thermoplastic plastic material.

4. The portable transport container as claimed in claim 1, wherein the plurality of reinforcing elements have fibers which are connected in a firmly bonded manner to the plastic film.

5. The portable transport container as claimed in claim 4, wherein the fibers are selected from a group consisting of glass fibers, carbon fibers, aramid fibers or a mixture of at least two of these fibers.

6. The portable transport container as claimed in claim 1, wherein the at least one base panel is equipped on its under side with at least one grip element.

7. A transport container holder system of a vehicle, having at least one portable transport container as set forth in claim 1 and a trunk floor and/or a backseat bench of the vehicle wherein at least one open cavity accommodating one of the portable transport containers is provided in the trunk floor and/or in the backseat bench for each of the at least one portable transport container, wherein
the portable transport container can be held both in the open use position and in the closed storage position in a positive-locking manner in the open cavity, and wherein
a depth of the open cavity is adapted to a height of the portable transport container in the closed storage position in such a manner that an under side of the base panel is flush with the trunk floor or with the backseat bench when the base panel faces upwards.

8. The transport container holder system as claimed in claim 7, wherein a plurality of fixedly attached slide rails are provided on the trunk floor for each of the at least one portable transport container between the respective open cavity and a rear end of the trunk floor.

9. A method which is particularly suitable for production of the transport container of claim 1, comprising:
providing an injection molding device including an injection mold,
arranging reinforcing elements comprising plastic films in the injection mold,
closing the injection mold,
overspraying, by injection molding device, the reinforcing elements with a plastic melt for formation of either a base panel or a side panel,
cooling and opening a mold of the injection molding device, and
removing the base panel or the side panel.

10. The method as claimed in claim 9, wherein the arranging of the reinforcing elements comprising the plastic films in the injection mold includes the reinforcing elements being attached on a carpet floor piece which is adapted to a surface of the base panel, and the carpet floor piece being arranged with the reinforcing elements in the injection mold.

* * * * *